(12) United States Patent
Ma et al.

(10) Patent No.: US 8,189,656 B2
(45) Date of Patent: May 29, 2012

(54) HIGH-FIDELITY MOTION SUMMARISATION METHOD

(75) Inventors: Zhonghua Ma, North Epping (AU); I-Jan Eric Wang, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 12/137,013

(22) Filed: Jun. 11, 2008

(65) Prior Publication Data

US 2008/0310513 A1    Dec. 18, 2008

(30) Foreign Application Priority Data

Jun. 15, 2007    (AU) .............................. 2007202789

(51) Int. Cl.
*H04N 7/12* (2006.01)
*H04N 11/02* (2006.01)
*H04N 11/04* (2006.01)
(52) U.S. Cl. .......... 375/240.01; 375/240.21; 375/240.29
(58) Field of Classification Search .................. None
See application file for complete search history.

(56) References Cited

U.S. PATENT DOCUMENTS

| | | | | |
|---|---|---|---|---|
| 4,942,466 A | * | 7/1990 | Sandbank et al. ....... | 375/240.01 |
| 5,355,168 A | * | 10/1994 | Sugiyama ............... | 375/240.16 |
| 5,781,249 A | * | 7/1998 | Hwang ..................... | 348/699 |
| 5,832,234 A | | 11/1998 | Iverson et al. | |
| 6,075,906 A | * | 6/2000 | Fenwick et al. ........... | 382/298 |
| 6,456,661 B1 | * | 9/2002 | Morel ...................... | 375/240.16 |
| 6,504,872 B1 | * | 1/2003 | Fimoff et al. ........... | 375/240.27 |
| 6,934,334 B2 | * | 8/2005 | Yamaguchi et al. ..... | 375/240.16 |
| 7,020,207 B1 | | 3/2006 | Tavares | |
| 7,254,174 B2 | * | 8/2007 | Pau et al. ................. | 375/240.01 |
| 2006/0072665 A1 | | 4/2006 | Cho et al. ................. | 375/240.16 |
| 2008/0089414 A1 | * | 4/2008 | Wang et al. .............. | 375/240.13 |

FOREIGN PATENT DOCUMENTS

WO    01/41451 A1    6/2001

OTHER PUBLICATIONS

Feb. 8, 2010 Examiner's First Report in Australian Patent Appln. No. 2007202789.

* cited by examiner

*Primary Examiner* — Kevin C Harper
*Assistant Examiner* — Cassandra Decker
(74) *Attorney, Agent, or Firm* — Fitzpatrick, Cella, Harper & Scinto

(57) ABSTRACT

Disclosed is a method (800) and an apparatus (250) for generating a scaled motion vector for a particular output coding unit, the method comprising determining (802) statistics of motion data from an area-of-interest selecting (804) from a pre-defined set (805-807) of re-sampling filters a re-sampling filter dependent upon said determined statistics for the particular output coding unit, and applying the selected re-sampling filter to motion vectors from said area-of-interest to generate the scaled motion vector.

11 Claims, 14 Drawing Sheets

HIGH-FIDELITY MOTION SUMMARISATION METHOD

CROSS-REFERENCE TO RELATED PATENT APPLICATIONS

This application claims the right of priority under 35 U.S.C. §119 based on Australian Patent Application No 2007202789, filed 15 Jun. 2007, which is incorporated by reference herein in its entirety as if fully set forth herein.

FIELD OF INVENTION

The current invention relates generally to digital video signal processing, and in particular to methods and apparatus for improving the fidelity of motion vectors generated by video trancoding systems employing video resolution conversion and bit-rate reduction. In this context, "fidelity" means the degree to which a generated motion vector resembles the optimal motion vector value.

BACKGROUND

Digital video systems have become increasingly important in the communication and broadcasting industries. The International Standards Organization (ISO) has established a series of standards to facilitate the standardisation of compression and transmission of digital video signals. One of the standards, ISO/IEC 1318-2 entitled "Generic Coding of Moving Picture and Associated Audio Information" (or MPEG-2 in short, where "MPEG" stands for "Moving Picture Experts Group") was developed in late 1990's. MPEG-2 has been used to encode digital video for a wide range of applications, including the Standard Definition Television (SDTV) and the High Definition Television (HDTV) systems.

In a typical MPEG-2 encoding process, digitized luminance and chrominance components of video pixels are input to an encoder and stored into macroblock (MB) structures. Three types of pictures are defined by the MPEG-2 standard. These picture types include "I-picture", "P-picture", and "B-picture". According to the picture type, Discrete Cosine Transform (DCT) and Motion Compensated Prediction (MCP) techniques are used in the encoding process to exploit the spatial and temporal redundancy of the video signal thereby achieving compression.

The I-picture represents an Intra-coded picture that can be reconstructed without referring to the data in other pictures. Luminance and chrominance data for each intra-coded MB in the I-picture are first transformed to the frequency domain using a block-based DCT, to exploit spatial redundancy that may be present in the I-picture. Then the high frequency DCT coefficients are coarsely quantised according the characteristics of the human visual system. The quantised DCT coefficients are further compressed using Run-Level Coding (RLC) and Variable Length Coding (VLC), before finally being output into the compressed video bit-stream.

Both the P-picture and the B-picture represent inter-coded pictures that are coded using motion compensated data based upon other pictures. FIG. 10 illustrates the concept of a picture that is composed using inter-coding. For an inter-coded MB 104 in a current picture 101 in question, the MCP technique is used to reduce the temporal redundancy with respect to the reference pictures (these being pictures that adjoin the current picture 101 in the temporal scale, such as a "previous picture" 102 and a "next picture" 103 in FIG. 10) by searching in a search area 105 in a said reference picture 102 to find a block which minimizes a difference criteria (such as mean square error) between itself and 104.

The block that results in the minimal difference over the search area is named as "the best match block" being the block 106 in FIG. 10. Then, the displacements between 101 and 102 in the horizontal (X) and the vertical directions (Y) are calculated, to form respective motion vectors (MV) 104 which are associated with 101. After that the pixel-wise difference between 101 and 104, which is referred to as the "motion residue", is calculated between two blocks and compressed using block-based DCT and quantisation. Finally, the motion vector and associated quantised motion residues are entropy-encoded using VLC and output to the compressed video bit-stream.

The principal difference between a P-picture and a B-picture lies in the fact that a MB in a P-picture only has one MV which corresponds to the best-matched block in the previous picture (i.e., vector 107 for block 106 in picture 102), while a MB in a B-picture (or a "bidirectional-coded MB") may have two MVs, one "forward MV" which corresponds to the best-matched block in the previous picture, and one "backward MV" which corresponds to the best-matched block in the next picture (i.e., vector 109 for block 108 in picture 103). The motion residue of a bidirectional-coded MB is calculated as an average of the motion residue produced by the forward MV and by the backward MV.

With the diversity of digital video applications, it is often necessary to convert the compressed MPEG-2 bit-stream from one resolution to another. Examples include conversion from HDTV to SDTV, or from the pre-encoding bit-rate to another different bit-rate for re-transmission. In this description the input to a resolution conversion module is referred to as the input stream (or input compressed stream if appropriate), and the output from the resolution conversion module is referred to as the scaled output stream (or scaled compressed output stream if appropriate).

One solution to this requirement uses a "tandem transcoder", in which a standard MPEG-2 decoder and encoder are cascaded to provide the resolution and bit-rate conversions. However, fully decoding and encoding MPEG-2 compressed bit-streams demands heavy computational resources, particularly by the operation-intensive MCP module in the MPEG-2 encoder. As a result, the tandem transcoding approach can be an inefficient solution for resolution or bit-rate conversion of compressed bit-streams.

Recently new types of video transcoders have been used to address the computational complexity of the tandem solution. Thus, for example, the computational cost of operation-intensive modules, such as the MCP on the encoding side, has been avoided through predicting the output parameters, which usually includes the encoding mode (such as intra-coded, inter-coded, or bidirectional-coded) and the MV value associated with current MB (or "current coding unit"), from side information (which may include the encoding mode, the motion vector, the motion residues, and quantisation parameters associated with each MB unit) extracted from the input compressed bit-streams. Such transcoders are able to achieve a faster speed than the tandem solution, at a cost of marginal video quality degradation.

When down-converting compressed bit-streams, such as when converting a high quality HDTV MPEG-2 bit-stream to a moderate quality SDTV MPEG-2 bit-stream, the prediction of the output motion vectors can be performed using a motion summarization algorithm based upon the input motion data of a supporting area from which the output macroblock is down-scaled.

One motion summarization algorithm usually predicts the output MV as a weighted average of all the input MV candidates. The algorithm determines the significance of each MV candidate according to some activity measure, which can be the overlap region size, the corresponding motion residue energy, the coding complexity, and others. However, this approach is prone to outliers (which are MVs which have values significantly different from their neighbours) in the MV candidates that can reduce the performance in non-smooth motion regions.

An order statistics based algorithm has been developed to counter the aforementioned outlier problem. This approach uses scalar median, vector median, and weight median algorithms. These algorithms are able to overcome the effects of outlier motion vectors, and some of the algorithms (i.e., the weight median) are able to take into account the significance of each MV candidate. However, these algorithms do not perform well in the vicinity of a steep motion transition such as object boundary.

There have been some techniques based upon a hybrid of the weighted average and weighted median together, to produce an output by selecting the best one according to block-based matching criteria. However, due to the limitation of weighted average/median (i.e., weighted average tends to smooth a steep motion transition, while weighted median tends to shift the position of a motion transition), the hybrid technique is still unable to provide good results in the vicinity of object boundaries and high texture areas.

SUMMARY

It is an object of the present invention to substantially overcome, or at least ameliorate, one or more disadvantages of existing arrangements.

Disclosed are arrangements, referred to as Area of Interest Motion Vector Determination, or AIMVD arrangements, which seek to address the above problems by selecting and using a plurality of different motion vector processes on a macroblock sequence basis. AIMVD provides an improved motion summarization technique for transcoding of compressed input digital video bit-streams, which can often provide better motion prediction accuracy for complex content regions and higher computation efficiency than current techniques. The preferred AIMVD arrangement generates (ie predicts), for use in resolution transcoding, high fidelity output motion vectors from pre-processed motion data.

FIG. 8 is a process flow diagram depicting a method 800 for practicing the AIMVD approach. In order to achieve the high fidelity prediction of output motion vectors using the AIMVD approach, the method 800 commences with a start step 801, after which a step 802 analyses the motion statistics of an "area-of-interest area", which comprises not only "supporting areas" (see 120 in FIG. 2) of the output motion vector, but also "adjoining neighbours" (see 410 in FIG. 4) of the scaled output motion vector (eg see FIG. 4). Then, in a step 803, according to the analysis results from the step 802, the current coding unit (i.e., macroblock), such as 130 in FIG. 4, is classified into one of a set of representative region types, which includes but is not limited to "smooth region", "object boundary", "distorted region", and "high contrast textures". A subsequent step 804 applies a classification-oriented decision process to determine which of a set of re-sampling processes to apply. Finally, according to the decision made by the step 804, one out of a corresponding set of re-sampling processes 805-807 is applied to the current coding unit to generate, in a step 808, an output motion vector. The process 800 terminates with an end step 809.

The re-sampling processes 805-807 can be tweaked online or offline to achieve the best performance in regard to each representative region type, through optimization algorithms. The region classifier step 803 can also be improved via an offline training procedure (i.e., tweaking parameters employed by the region classifier using a maximum-likelihood estimation process based on a set of pre-classified video data) to further strengthen the accuracy of the output motion vectors.

The foregoing has outlined rather broadly the features and technical advantages of the AIMVD approach, so that those skilled in the art may better understand the detailed description of the AIMVD arrangements that follow. Additional features and advantages of the AIMVD arrangements are described. Those skilled in the art will appreciate that the specific embodiments disclosed can be used as a basis for modifying or designing other structures for carrying out the AIMVD approach.

According to a first aspect of the present invention, there is provided a method of generating a scaled motion vector for a particular output coding unit, said method comprising the steps of:

determining statistics of motion data from an area-of-interest;

selecting a re-sampling filter from a pre-defined set of re-sampling filters dependent upon said determined statistics for the particular output coding unit; and applying the selected re-sampling filter to motion vectors from said area-of-interest to generate the scaled motion vector.

According to another aspect of the present invention, there is provided an apparatus for generating a scaled motion vector for a particular output coding unit, said apparatus comprising:

an area of interest analyser for determining statistics of motion data from an area-of-interest;

a re-sampling filter selector, for selecting from a pre-defined set of re-sampling filters a re-sampling filter dependent upon said determined statistics for the particular output coding unit;

the pre-defined set of re-sampling filters; and a re-sampling module for applying the selected re-sampling filter to motion vectors from said area-of-interest to generate the scaled motion vector.

According to another aspect of the present invention, there is provided an apparatus for generating a scaled motion vector for a particular output coding unit, said apparatus comprising:

a memory for storing a program; and a processor for executing the program, said program comprising:

code for determining statistics of motion data from an area-of-interest;

code for selecting from a pre-defined set of re-sampling filters a re-sampling filter dependent upon said determined statistics for the particular output coding unit;

code for the pre-defined set of re-sampling filters; and code for applying the selected re-sampling filter to motion vectors from said area-of-interest to generate the scaled motion vector.

According to another aspect of the present invention, there is provided a computer program product having a computer readable medium having a computer program recorded therein for directing a processor to execute a method for generating a scaled motion vector for a particular output coding unit, said program comprising:

code for determining statistics of motion data from an area-of-interest;

code for selecting from a pre-defined set of re-sampling filters a re-sampling filter dependent upon said determined statistics for the particular output coding unit;

code for the pre-defined set of re-sampling filters; and code for applying the selected re-sampling filter to motion vectors from said area-of-interest to generate the scaled motion vector.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Figure 1:
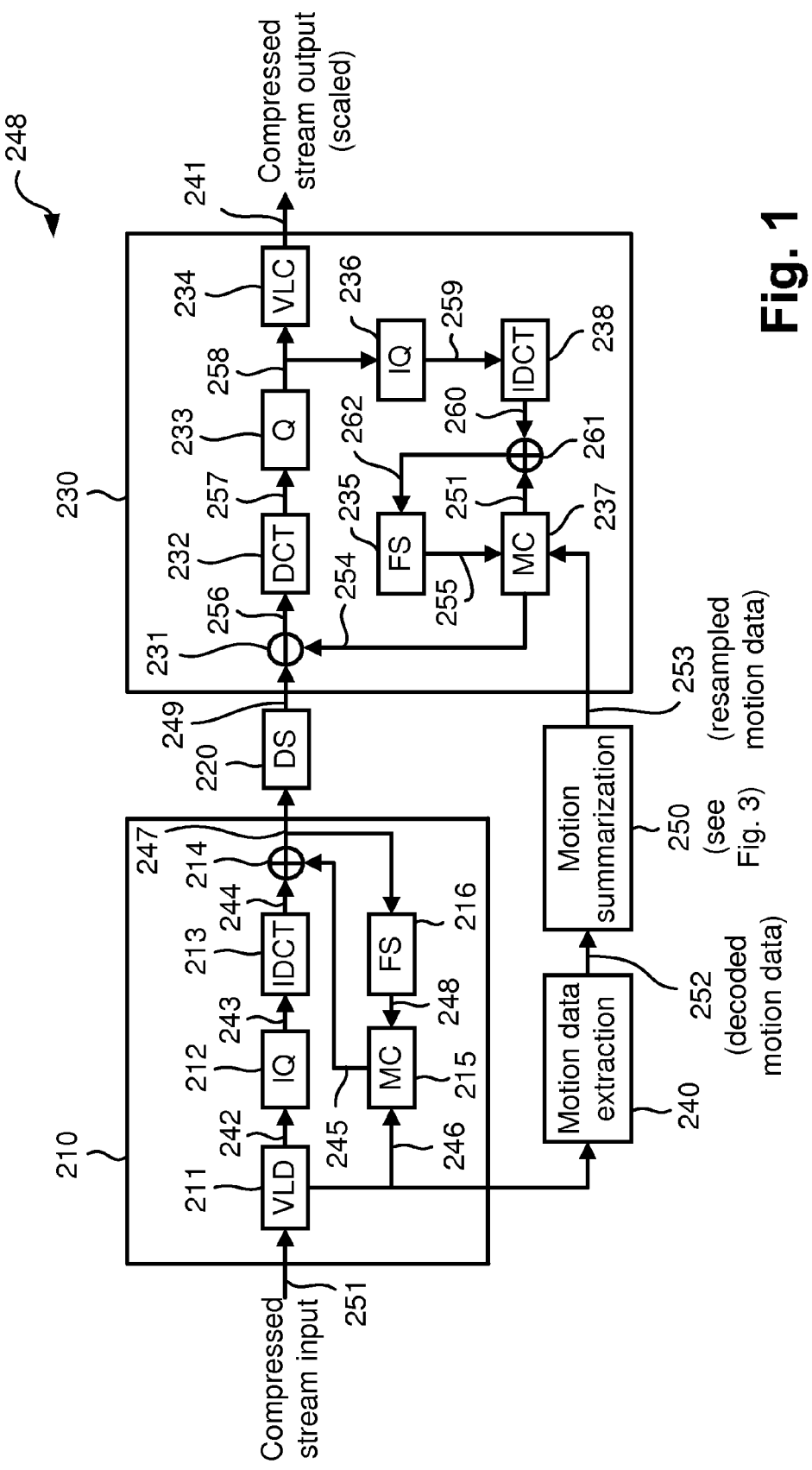
FIG. 1 is an example of a functional system block diagram of an MPEG transcoder using the AIMVD arrangements.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in this specification relating to prior art arrangements relate to discussions of documents or devices that form public knowledge through their respective publication and/or use. Such discussions should not be interpreted as a representation by the present inventor(s) or patent applicant that such documents or devices in any way form part of the common general knowledge in the art.

Detailed illustrative embodiments of the AIMVD arrangements are disclosed herein. However, specific structural and functional details presented herein are merely representative for the purpose of clarifying exemplary embodiments of the AIMVD arrangements. The proposed AIMVD arrangements may be embodied in alternative forms and should not be construed as limited to the embodiments set forth herein.

Overview

Figure 2:
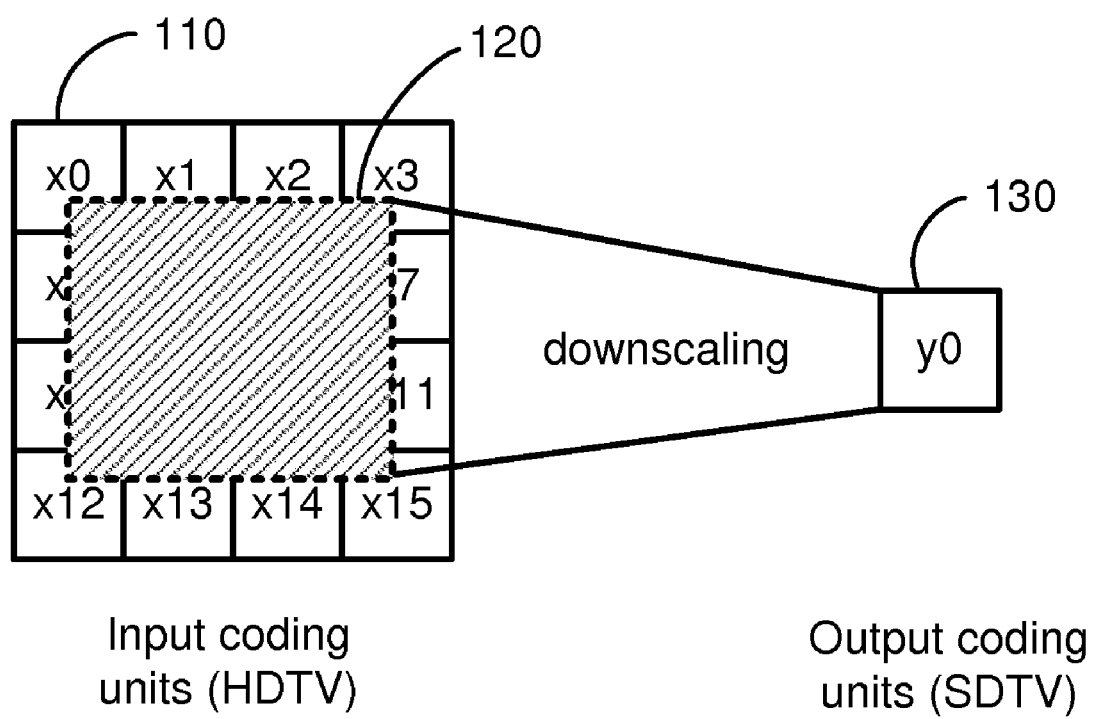
FIG. 2 depicts a basic approach for using motion summarization for HDTV to SDTV resolution conversion of MPEG bit-streams.

FIG. 2 depicts a basic approach for using motion summarization for HDTV to SDTV resolution conversion of an MPEG input bit-stream. A reference numeral 110 represents a set of input motion vectors that are associated with corresponding input coding units, x0-x15, that are covered by a supporting area 120 in the original HDTV resolution. The supporting area 120 is to be downscaled from HDTV to SDTV resolution in the example shown. The reference numeral 130 depicts an output motion vector that is associated with a corresponding output coding unit (y0) in the downscaled SDTV bit stream. The shaded region 120 represents the supporting area from which 130 is derived.

FIG. 1 is an example of a functional system block diagram of an MPEG transcoder 248 using the AIMVD arrangements. The transcoder consists of a video decoding module 210, a spatial downscaling module 220, a tailored video encoding module 230, a side information extraction module 240, and a motion summarization module 250. The disclosed transcoder can be implemented in hardware, in software, or in a hybrid form including both hardware and software.

Referring to FIG. 1, the module 210 first processes a compressed input video stream 251, such as an MPEG2-compliant HDTV stream that has been derived from a stream of video frames (not shown). Within 210 the input compressed stream is parsed by a variable length decoder (VLD) 211 to produce quantised DCT coefficients at 242. Then the DCT coefficients are inversed quantised (IQ) by a module 212, the output (243) of which is inverse DCT transformed (IDCT) by a module 213 to produce the pixel domain motion residues 244. Meanwhile, a motion compensation (MC) module 215 is employed to generate motion prediction data 245 based upon a motion vector (MV) 246 that is extracted from the input stream and reference frame data 248 stored in a frame storage (FS) 216. The motion prediction data 245 from the motion compensation module 215 is summed with the corresponding motion residue data 244 in a summer 214. The output of the summation block 214 is reconstructed raw pixel data 247 (such as YUV 4:2:0 format raw video data in HDTV resolution) which is the primary output of the module 210. The pixel data 247 is also stored in the frame store 216 to be further used by the motion compensation module 215.

In the example MPEG transcoder 248, a spatial-domain downscaling (DS) filter 220 is used for resolution reduction. The filter 220 takes the reconstructed pixel data 247 from the decoding module 210 as its input. The filter 220 performs resolution conversion in the pixel domain by means of spatial downsample filtering according to the required scaling ratio (i.e., from HDTV to SDTV resolutions), and outputs downscaled pixel data 249 (such as YUV 4:2:0 format raw video data in SDTV resolution) into the encoding module 230.

Meanwhile, motion data 252 contained in the input compressed stream 251 is extracted by the side information extraction module 240, where the "motion data" includes, but is not limited, to the motion prediction mode, the motion vectors, and the motion residues (or DCT coefficients) associated with each coding unit in the input stream 251. The motion data 252 is fed into the motion summarization block 250 which generates a re-sampled version of the motion data 252, denoted as 253, according to the given scaling ratio to facilitate the encoding of the output bit-stream in the downscaled resolution by the video encoding module 230.

The video encoding module 230 of the example MPEG transcoder 248 can be implemented as a truncated-version of a standard MPEG encoder which avoids use of the computationally expensive motion estimation usually used. Instead, the motion data 253 from the motion summarization module 250 are directly inputted into a motion compensation (MC) module 237 which generates compensated pixel data 251, 254 from data 255 in the reference frame storage module 235. Then, the difference between the downscaled pixel data 249 and the compensated pixel data 254 from the motion compensation module 237 is calculated in a difference module 231. The output 256 from the difference module 231 is Discrete-Cosine transformed (DCT) in the DCT module 232. The output 257 from the DCT module 232 is quantised (Q) in the quantisation module 233 to match the required output bitrate, the output of which 258 is processed by a variable length encoding (VLC) module 234 which outputs the downscaled compressed stream 241.

The output 258 from the quantisation module 233 is also inverse quantised in an IQ module 236, the output 259 of which is inverse DCT transformed in an IDCT module 238. The output 260 of the IDCT module 238 is summed with the output 251 from the MC module 237 in a summation module before being input, as depicted by an arrow 262 for storage into the reference frame storage module 235 for use in the motion compensation of a subsequent coding unit.

The motion summarization module 250 used in the AIMVD arrangements efficiently generate high-fidelity motion vectors from input motion data for MPEG downscaling transcoding.

The performance of the transcoder 248 depends significantly on the quality of the downsampling filter 220, and the accuracy of the motion summarization module 250.

Figure 8:
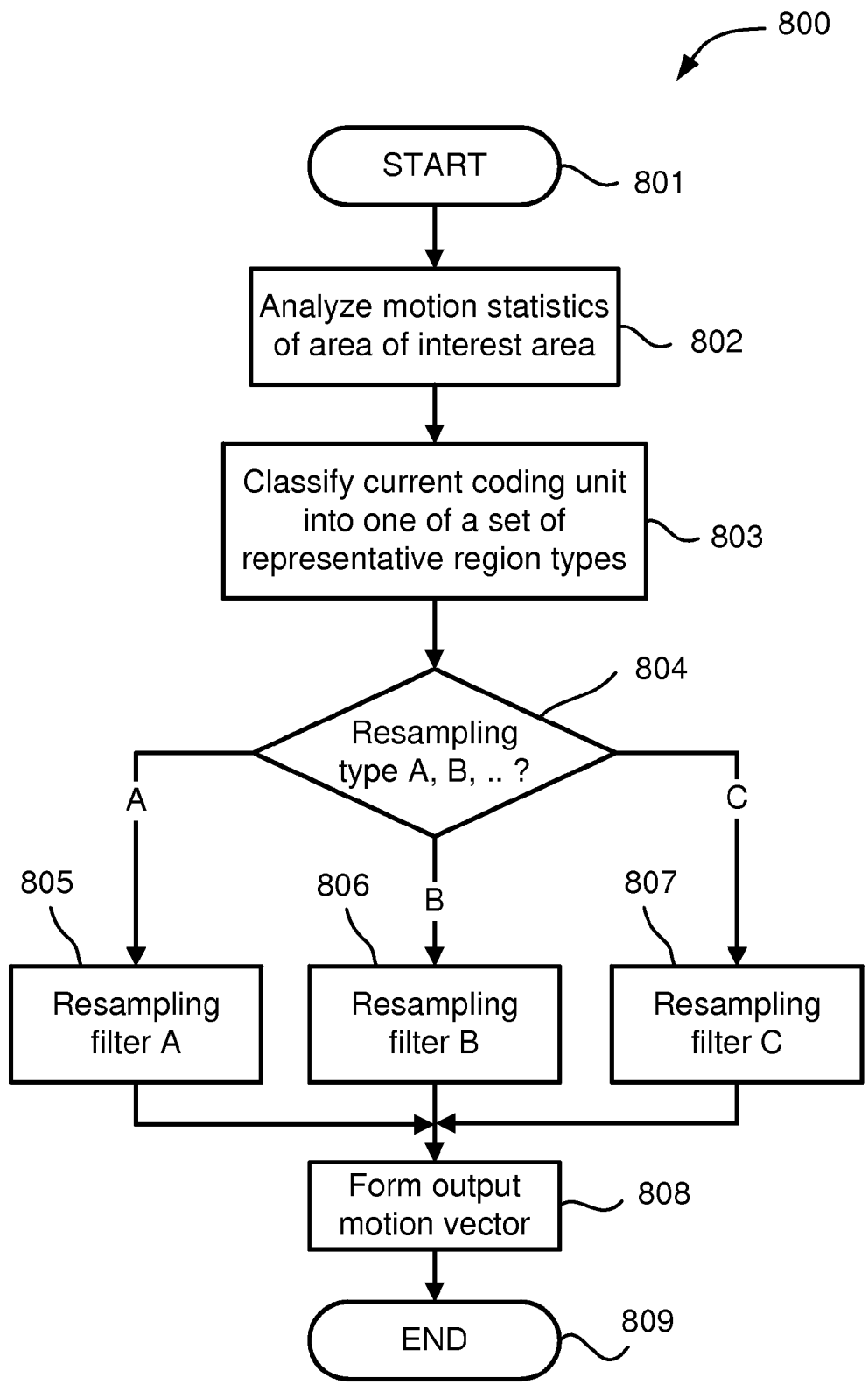
FIG. 8 is a process flow diagram depicting a method for practicing the AIMVD approach.
Figure 9:
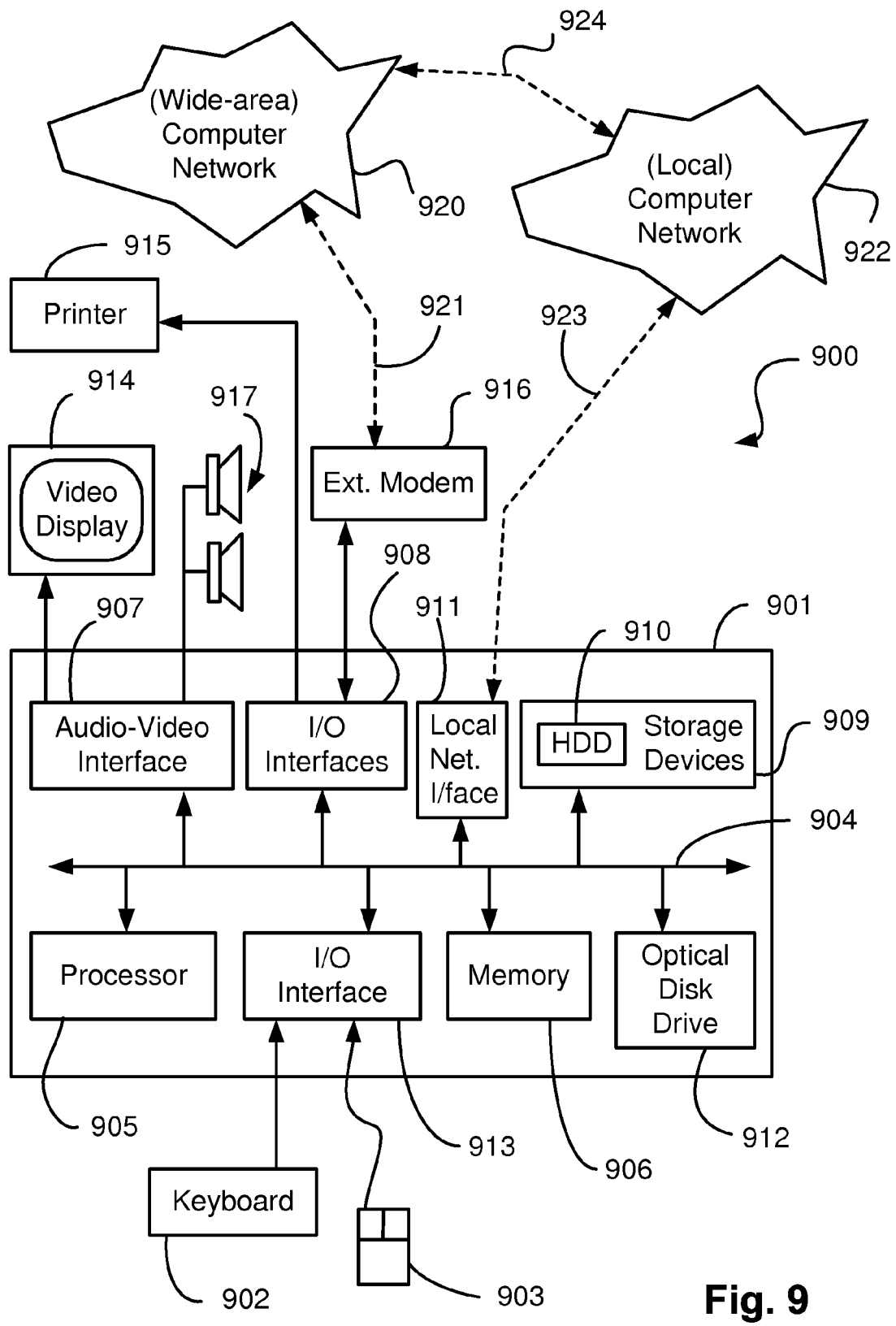
FIG. 9 is a schematic block diagram of a general purpose computer upon which the AIMVD arrangements can be practiced.
Figure 10:
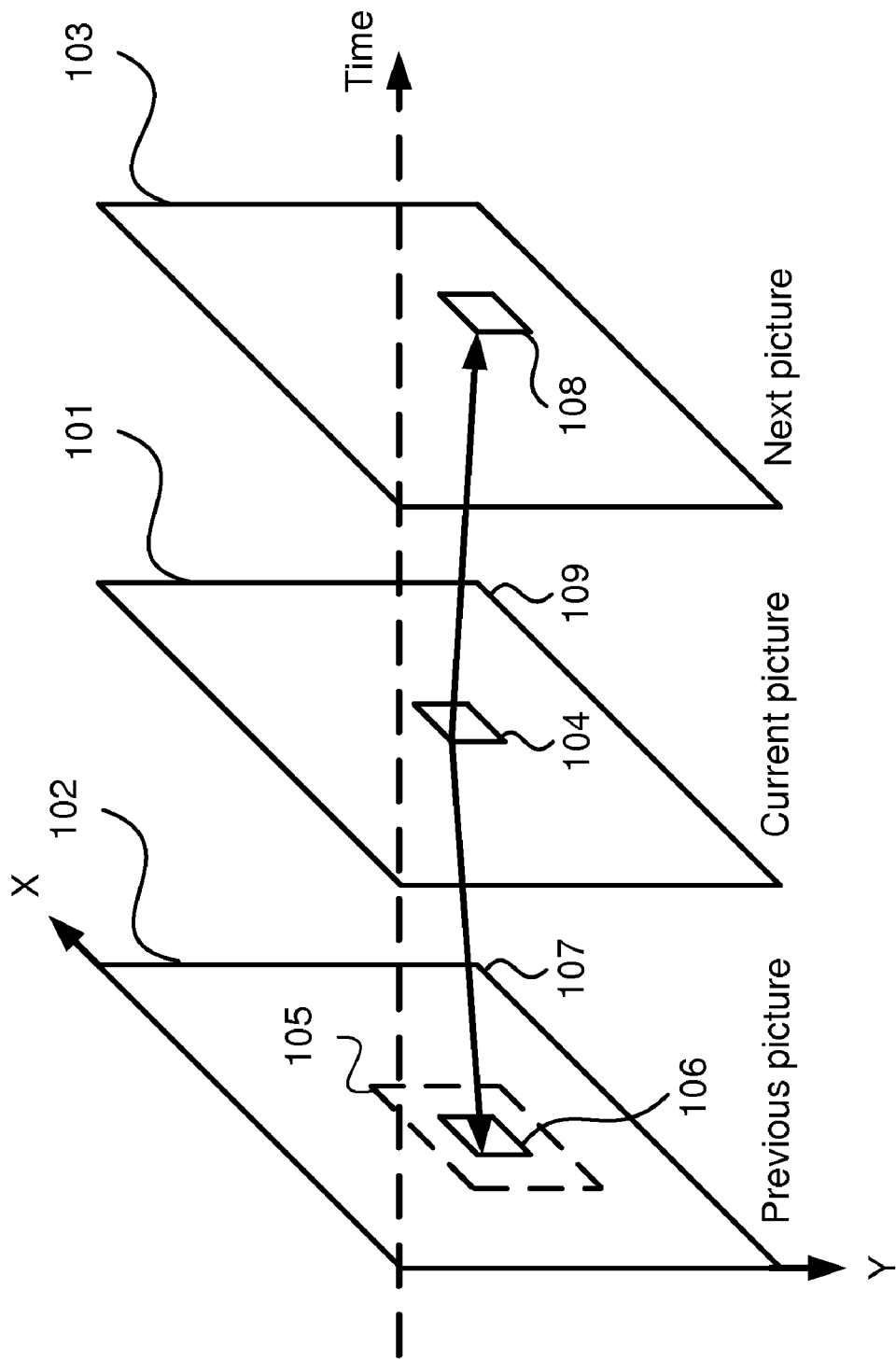
FIG. 10 depicts motion prediction of a macroblock in a current frame from a matching block located in reference frames.

FIG. 9 is a schematic block diagram of a general purpose computer system upon which the AIMVD arrangement of FIG. 1 can be practiced. The AIMVD methods may be implemented using a computer system 900 such as that shown in FIG. 9 wherein the AIMVD processes of FIGS. 8, 5A-5C, 6A-6C and 7 may be implemented as software, such as one or more application programs executable within the computer system 900. In particular, the AIMVD method steps can be effected by instructions in the software that are carried out within the computer system 900. The instructions may be formed as one or more code modules, each for performing one or more particular tasks.

The software may also be divided into two separate parts, in which a first part and the corresponding code modules performs the AIMVD methods, and a second part and the corresponding code modules manage a user interface between the first part and the user. The software may be stored in a computer readable medium, including the storage devices described below, for example. The software is loaded into the computer system 900 from the computer readable medium, and then executed by the computer system 900. A computer readable medium having such software or computer program recorded on it is a computer program product. The use of the computer program product in the computer system 900 preferably effects an advantageous apparatus for performing the AIMVD methods.

As seen in FIG. 9, the computer system 900 is formed by a computer module 901, input devices such as a keyboard 902 and a mouse pointer device 903, and output devices including a printer 915, a display device 914 and loudspeakers 917. An external Modulator-Demodulator (Modem) transceiver device 916 may be used by the computer module 901 for communicating to and from a communications network 920 via a connection 921. The network 920 may be a wide-area network (WAN), such as the Internet or a private WAN. Where the connection 921 is a telephone line, the modem 916 may be a traditional "dial-up" modem. Alternatively, where the connection 921 is a high capacity (eg: cable) connection, the modem 916 may be a broadband modem. A wireless modem may also be used for wireless connection to the network 920.

The computer module 901 typically includes at least one processor unit 905, and a memory unit 906 for example formed from semiconductor random access memory (RAM) and read only memory (ROM). The module 901 also includes an number of input/output (I/O) interfaces including an audio-video interface 907 that couples to the video display 914 and loudspeakers 917, an I/O interface 913 for the keyboard 902 and mouse 903 and optionally a joystick (not illustrated), and an interface 908 for the external modem 916 and printer 915. In some implementations, the modem 916 may be incorporated within the computer module 901, for example within the interface 908. The computer module 901 also has a local network interface 911 which, via a connection 923, permits coupling of the computer system 900 to a local computer network 922, known as a Local Area Network (LAN). As also illustrated, the local network 922 may also couple to the wide network 920 via a connection 924, which would typically include a so-called "firewall" device or similar functionality. The interface 911 may be formed by an Ethernet™ circuit card, a wireless Bluetooth™ or an IEEE 802.21 wireless arrangement.

The interfaces 908 and 913 may afford both serial and parallel connectivity, the former typically being implemented according to the Universal Serial Bus (USB) standards and having corresponding USB connectors (not illustrated). Storage devices 909 are provided and typically include a hard disk drive (HDD) 910. Other devices such as a floppy disk drive and a magnetic tape drive (not illustrated) may also be used. An optical disk drive 912 is typically provided to act as a non-volatile source of data. Portable memory devices, such optical disks (eg: CD-ROM, DVD), USB-RAM, and floppy disks for example may then be used as appropriate sources of data to the system 900.

The components 905, to 913 of the computer module 901 typically communicate via an interconnected bus 904 and in a manner which results in a conventional mode of operation of the computer system 900 known to those in the relevant art. Examples of computers on which the described arrangements can be practiced include IBM-PC's and compatibles, Sun Sparcstations, Apple Mac™ or alike computer systems evolved therefrom.

Typically, the AIMVD application programs discussed above are resident on the hard disk drive 910 and read and controlled in execution by the processor 905. Intermediate storage of such programs and any data fetched from the networks 920 and 922 may be accomplished using the semiconductor memory 906, possibly in concert with the hard disk drive 910. In some instances, the AIMVD application program(s) may be supplied to the user encoded on one or more CD-ROM and read via the corresponding drive 912, or alternatively may be read by the user from the networks 920 or 922. Still further, the software can also be loaded into the computer system 900 from other computer readable media.

Computer readable media refers to any medium that participates in providing instructions and/or data to the computer system 900 for execution and/or processing. Examples of such non-transitory storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 901. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the AIMVD application programs and the corresponding code modules mentioned above may be executed to implement one or more graphical user interfaces (GUIs) to be rendered or otherwise represented upon the display 914. Through manipulation of the keyboard 902 and the mouse 903, a user of the computer system 900 and the application may manipulate the interface to provide controlling commands and/or input to the applications associated with the GUI(s).

The AIMVD approach may alternatively be implemented in dedicated hardware such as one or more integrated circuits performing the functions or sub functions of the AIMVD approach. Such dedicated hardware may include graphic processors, digital signal processors, or one or more microprocessors and associated memories.

High Fidelity Motion Summarization Framework

Figure 3:
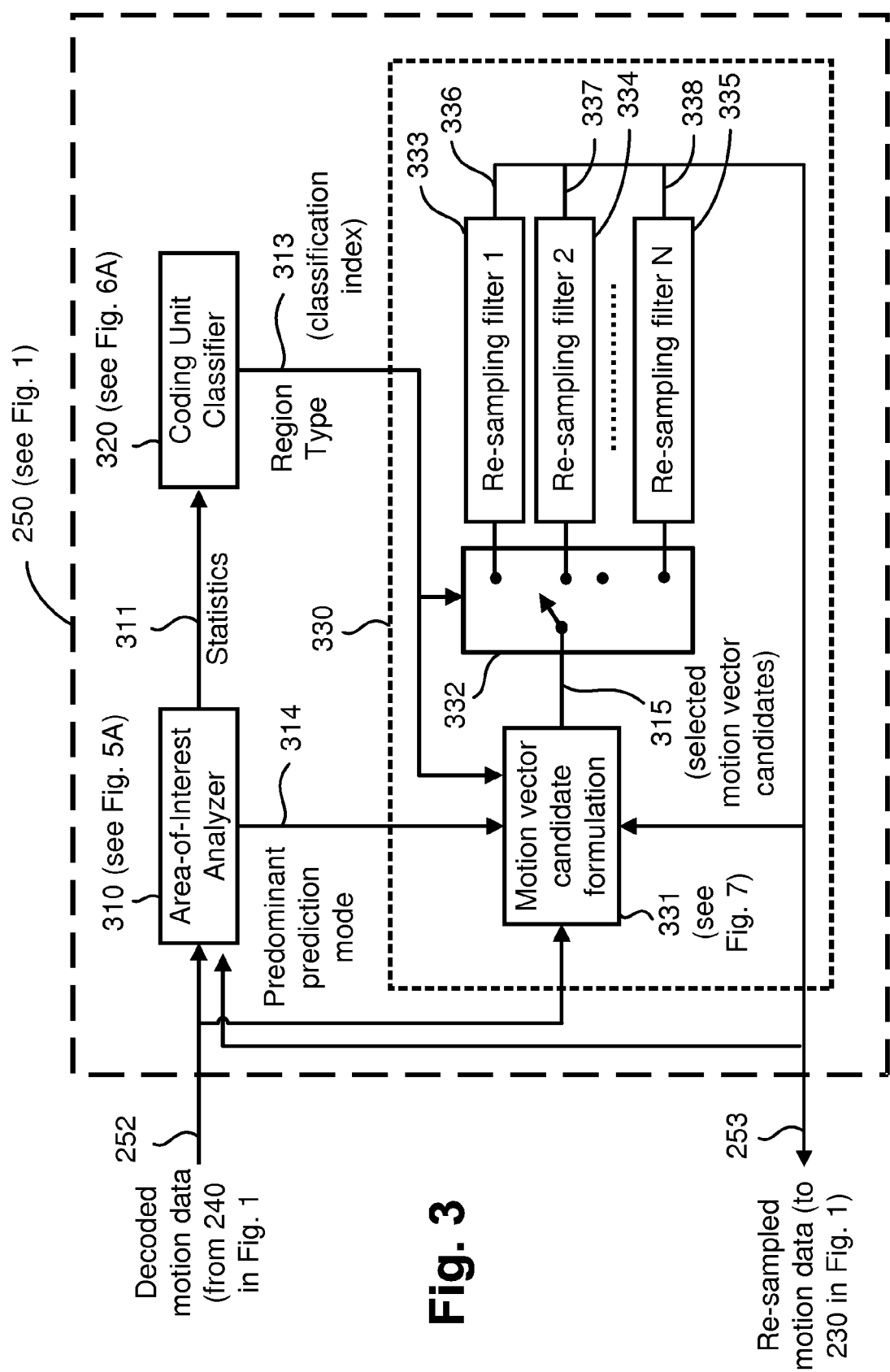
FIG. 3 is a functional block diagram of the motion summarization module of FIG. 1.

FIG. 3 is a functional block diagram of the motion summarization module of FIG. 1. The decoded motion data 252 that is extracted by the motion data extraction module 240, is inputted into an area-of-interest analyser 310 to generate motion statistics data 311 (such as the mean or the scalar deviation of the extracted motion vector/residue). The analyser 310 also produces, for the given area-of-interest, a prediction mode which is used by the majority of the coding units in the current area-of-interest, denoted as the "predominant prediction mode" 314, to facilitate operation of a classification-oriented re-sampling module 330. The "predominant prediction mode" may be frame based forward prediction, frame based backward prediction, frame based bidirectional prediction field based forward prediction, field based and backward prediction, and field based bidirectional direction, but is not limited to the aforementioned options.

The statistics data 311 from the module 310 is inputted into a coding unit classifier 320. The classifier 320 classifies a current output coding unit as belonging to one of the representative region types, which can include "smooth region", "object boundary", "distorted region", "high contrast textures", and others. The output 313 from the classifier 320 is an index representing the classified representative region type associated with the current output coding unit. This information 313 is used to control the classification-oriented re-sampling module 330.

The resampling module 330 comprises a motion vector candidate formation block 331, a switch based control block 332, and a pre-defined set of re-sampling filters 333-335. The respective outputs 336-338 of the resampling filters 333-335 constitute the re-sampled motion data 253, which can include the prediction mode and the motion vector, as well, possibly, as other information.

The re-sampled motion data 253 is outputted to the encoding module 230 (see FIG. 1), and is also fed back to the area-of-interest analyser 310 to facilitate processing of subsequent coding units. The re-sampling process 330 can be tweaked using optimization algorithms in order to achieve improved performance in regard to each representative region type. The region classifier 320 can also be improved via offline training procedures to further improve the accuracy of the output motion vectors.

Figure 4:
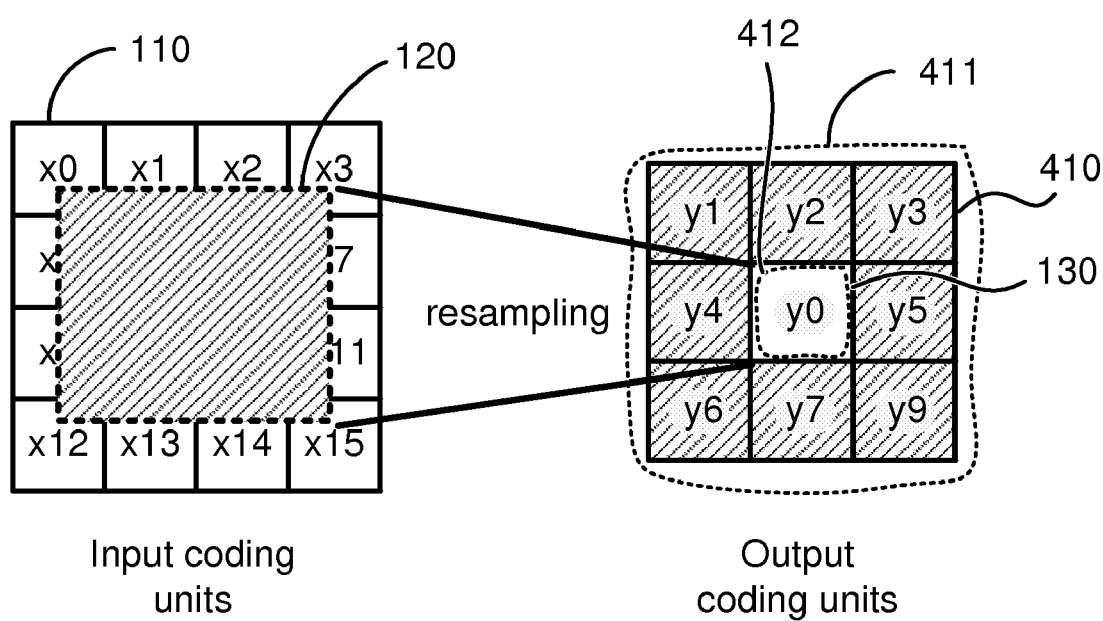
FIG. 4 depicts an area-of-interest area for a particular output coding unit when transcoding from HDTV to SDTV resolution using the AIMVD approach.

FIG. 4 depicts an area-of-interest area for an output coding unit when transcoding from HDTV to SDTV resolution using the AIMVD approach. The area-of-interest is depicted by shaded areas in FIG. 4, and includes not only the support area 120 of the input coding units, x0-x15, but also the shaded area encompassed in the roughly annular region between the dashed lines 411 and 412, relating to the adjoining neighbours y1-y8 of the scaled output coding unit y0 (having an associated motion vector 130). This area-of-interest is able to reveal local motion distribution in two different resolution scales (original resolution and scaled resolution). As a result, the accuracy of the motion statistics and the process afterward is typically improved over previous approaches.

Area-of-Interest Motion Analysis

Figure 5A:
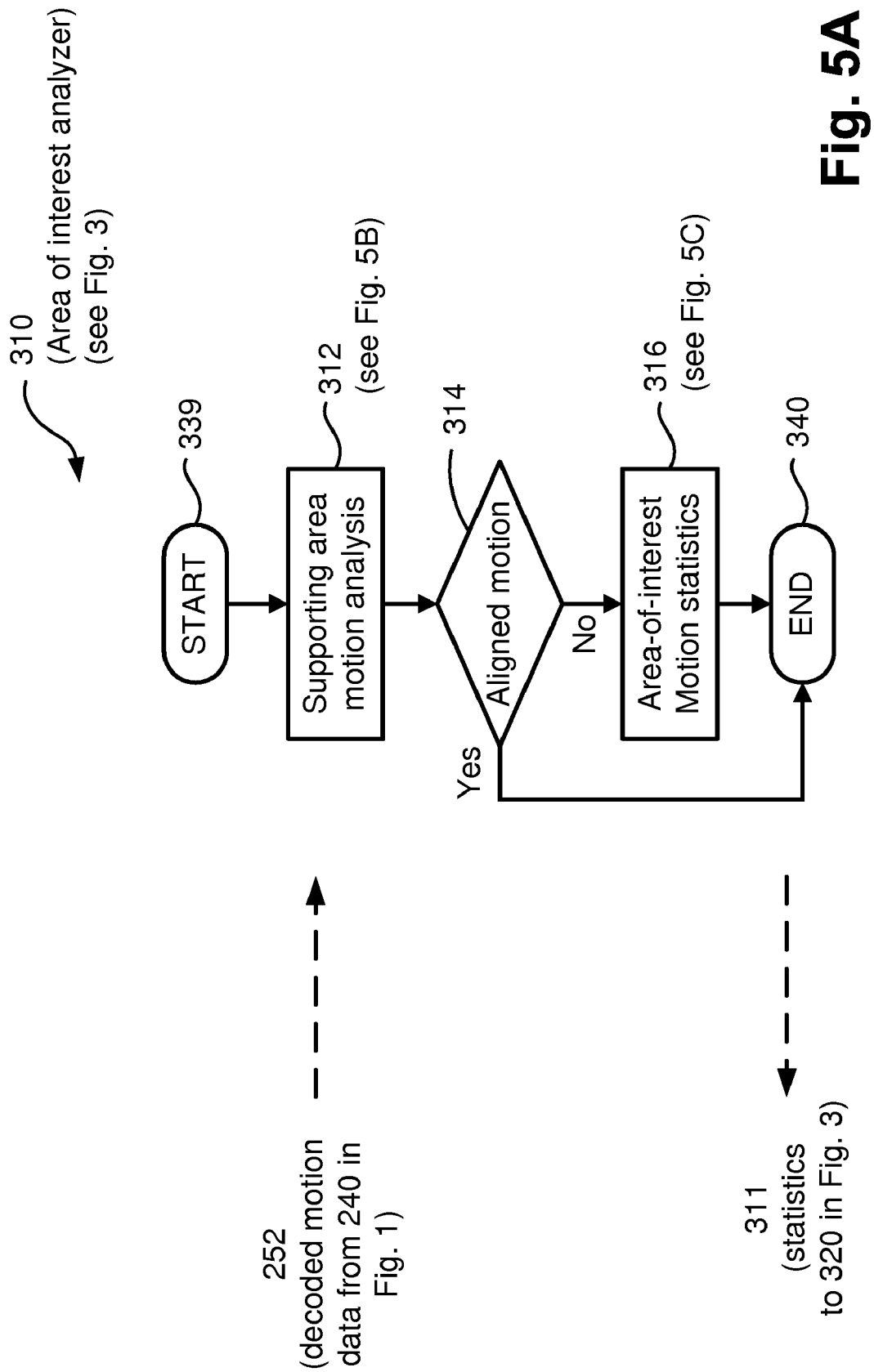
FIG. 5A is a process flow chart for the area-of-interest analyser of FIG. 3.

FIG. 5A is a process flow chart for the area-of-interest analyser 310 of FIG. 3. For each output coding unit in the decoded motion data 252 from the motion data extraction module 240 in FIG. 1, the area of interest analyser 310 starts, after a start step 339, with a supporting area motion analysis in a step 312. Then in a step 314, the analyser 310 determines if the motion data in the supporting area 120 is aligned or not. The term "aligned" means that all the coding units covered by the supporting area 120 have the same prediction mode (such as Intra mode, Skip mode, or Inter mode) with an equal motion vector value. If the motion data is not aligned over the entire supporting area 120, then the analyser follows a NO arrow and activates an area-of-interest motion statistics process 316 which derives more specific motion statistics data on the area-of-interest (which includes both the supporting area 120 and the shaded area between the dashed lines 411 and 412). These statistics are output as depicted by the dashed arrow 311 to the coding unit classifier 320 in FIG. 3. This analysis process is repeated each time a subsequent output coding unit is processed.

Figure 5B:
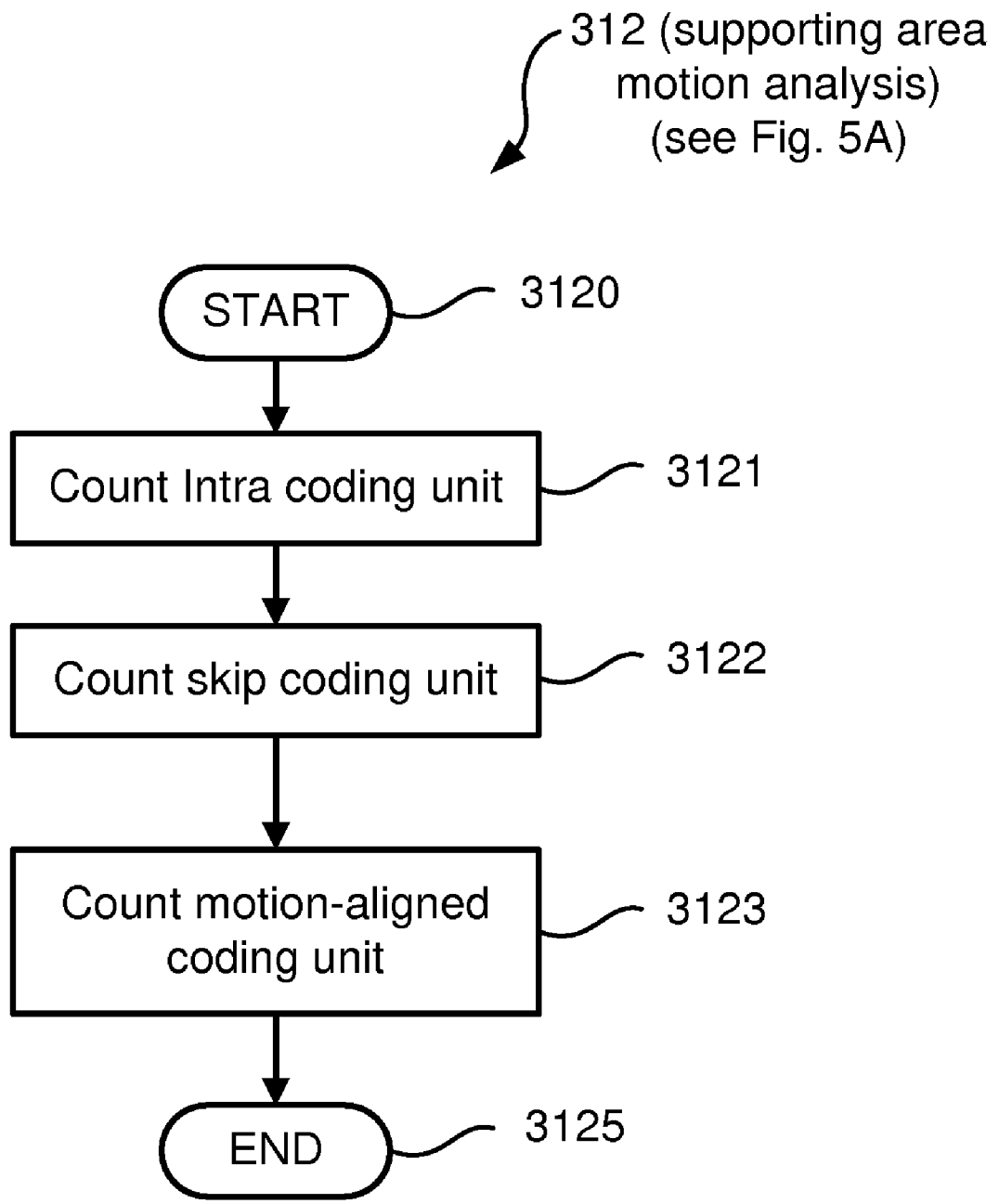
FIG. 5B is a process flow chart for the supporting area motion analysis process of FIG. 5A.

FIG. 5B is a process flow chart for the supporting area motion analysis process 312 of FIG. 5A. The process 312 commences with a step 3120 which operates on the extracted side information 252 corresponding to the coding units covered by the supporting area 120. The process 312 counts, in respective successive steps 3121-3123, the number of intra coding units, the number of skip coding units, and the number of Inter coding units having equal motion vector values. Thereafter in a step 3125 the process 312 terminates, and the aforementioned analysis data for the supporting area 120 is outputted accordingly to the process 314 in FIG. 5A.

Figure 5C:
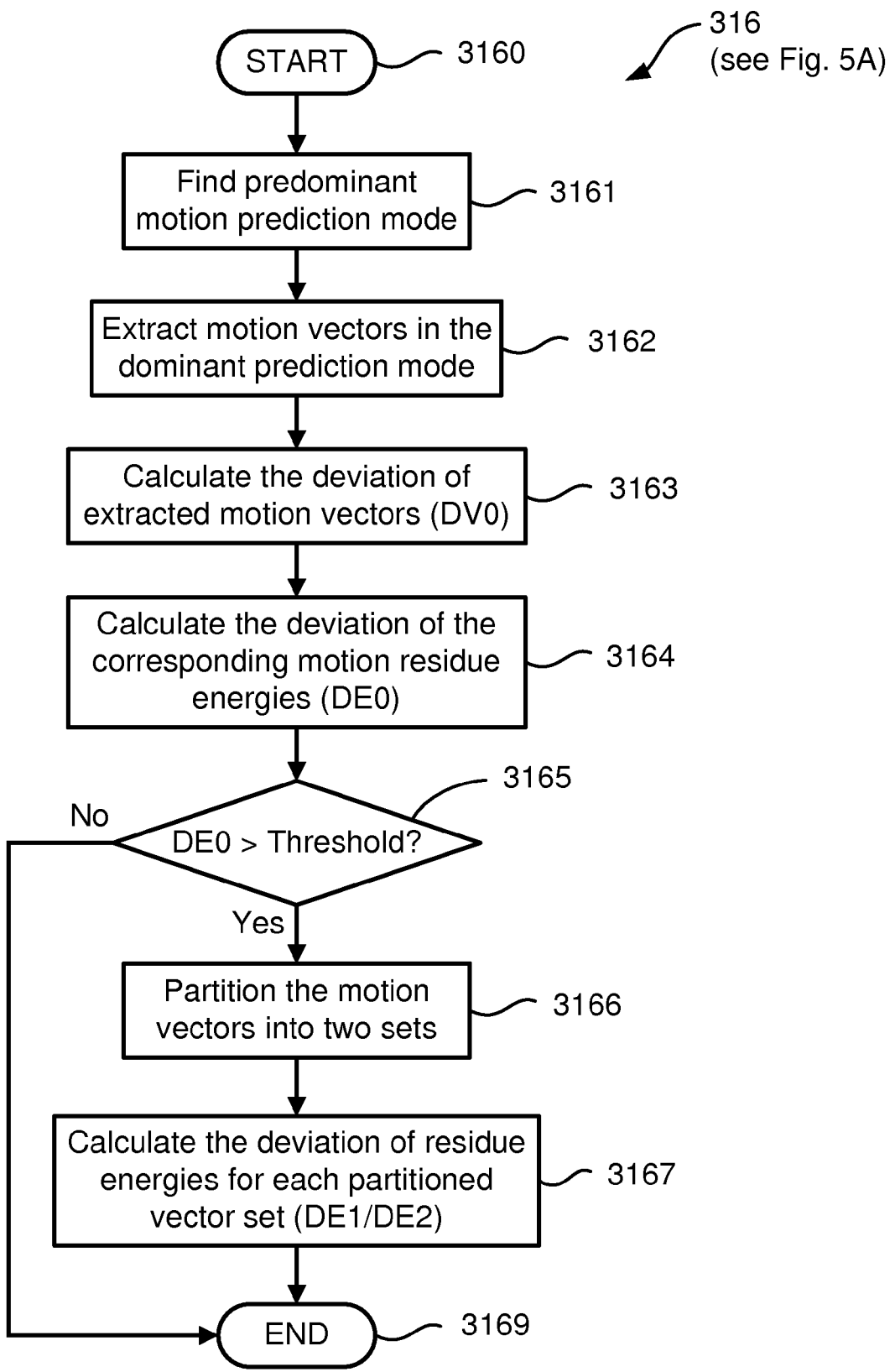
FIG. 5C is a process flow chart for the area-of-interest motion statistics process in FIG. 5A.

FIG. 5C is a process flow chart for the area-of-interest motion statistics process 316 in FIG. 5A. The process 316 commences with a step 3160 which inputs the extracted side information 252 from the motion data extraction module 240 in FIG. 1, this side information corresponding to the current area-of-interest (the supporting area 120 plus the shaded annular region between the dashed lines 411 and 412 in FIG. 4) of the current output coding unit. The process 316 then finds the predominant prediction mode from the side information belonging to the current area-of-interest in a step 3161.

For the dominant prediction mode found by the step 3161, the process 316 extracts, in a step 3162, all the motion vectors in the predominant prediction mode from the current area-of-interest. Then, in a step 3163, the L2-norm deviation for the extracted motion vectors of the current area-of-interest is determined. The L2-norm deviation may be determined by firstly finding the Vector Median of the extracted motion vector set in the predominant prediction mode, then calculating the Median Absolute Deviation (MAD) against the Vector Median in the L2-norm based on the extracted motion vectors associated with the predominant prediction mode. Such a deviation is denoted as DV0.

In a subsequent step 3164, the deviation of the motion residue energy (ie the "motion residue energy" which denotes the sum of the absolute value of all the DCT coefficients of the current coding unit) which is associated with each extracted motion vector in the predominant prediction mode is determined. This motion residue may be determined using the mean of the square sum of all the DCT coefficients which are associated with the entire set of motion vectors in the predominant prediction mode. The deviation may be obtained by firstly finding the median of the entire motion energy set, then calculating the Median Absolute Deviation (MAD) against the median based on the entire set of motion residue energies associated with the predominant prediction mode. Such a deviation is denoted as DE0.

In a subsequent step 3165, the deviation DE0 is compared to a preset threshold. If the value of DE0 is smaller than the threshold, then no more analysis steps are needed for the predominant prediction mode on the current area-of-interest area, and the process follows a NO arrow to an END step 3169.

Returning to the step 3165, if the value of DE0 is greater than the threshold, then the process 316 follows a YES arrow from the step 3165 and the entire eligible motion vector set associated with the current area-of-interest is partitioned in a step 3166 into two sub-sets according to the distribution of their associated motion residue energy. The partition may be determined by the mean of Fisher Discrimination, where the boundary of the two sub-sets is found if the difference between the variance of two sub-sets divided by the mean sum of two sub-sets reaches its maximum.

After partitioning the motion vectors in the predominant prediction mode into two sub-sets in the step 3166, a step 3167 determines the deviations of the motion residue energies associated with each partitioned motion vector sub-set. These deviations can be determined by firstly finding the median of the each motion energy sub-set, then calculating the MAD based on the median of each motion residue energy sub-set. These deviations are denoted as DE1 and DE2. After that the process 316 is directed to the END step 3169, terminating the process 316 for the current region-of-interest, and the motion statistics data is output, as depicted by a dashed arrow 311 (see FIG. 3), to the coding unit classification module 320.

Coding Unit Motion Classification

Figure 6A:
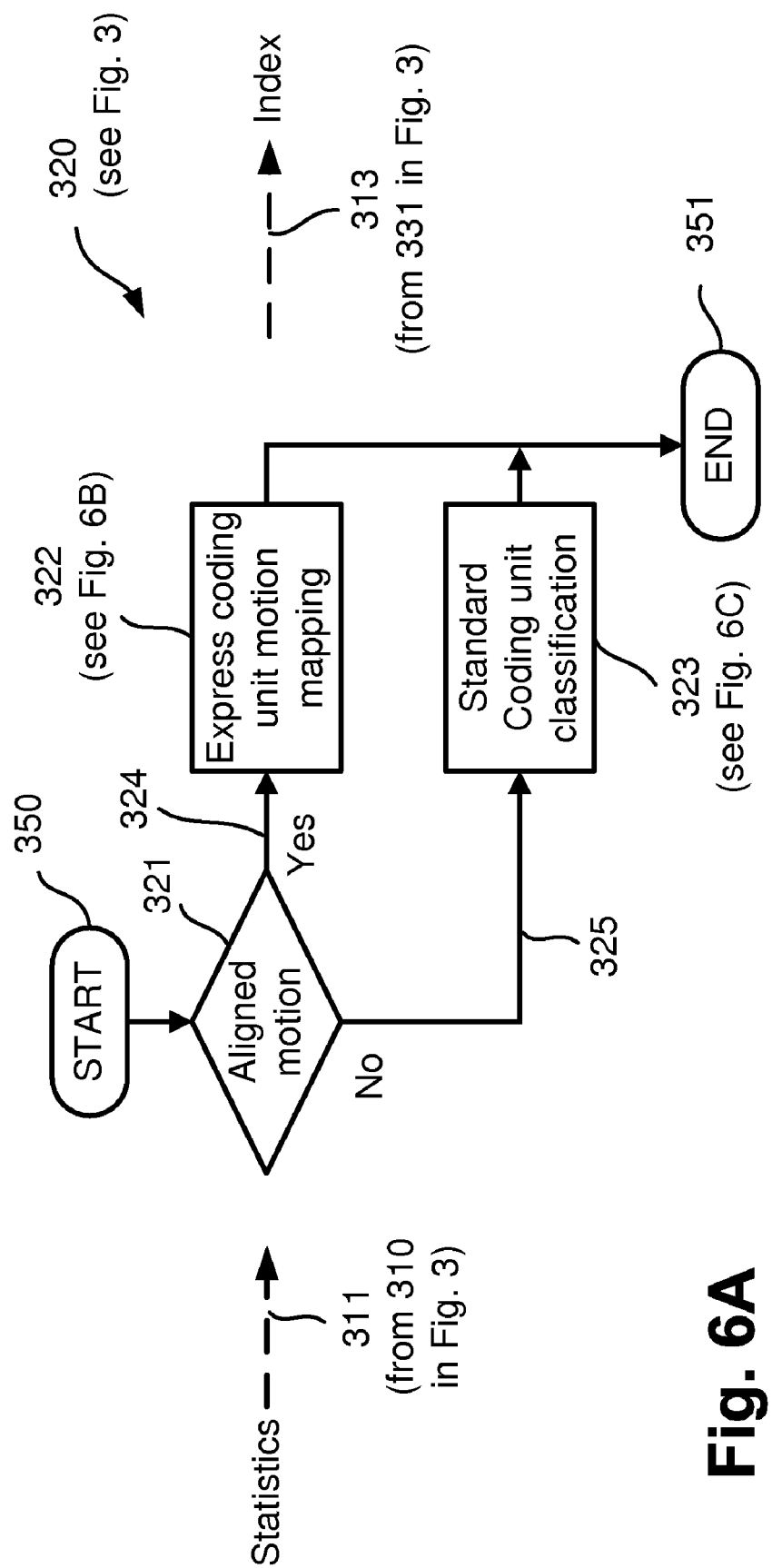
FIG. 6A is a process flow chart for the coding unit classification process in FIG. 3.

FIG. 6A is a process flow chart for the coding unit classification process 320 in FIG. 3. The process 320 commences with a start step 350, after which a decision process 321 considers the motion statistics data 311 from the area of interest analyser 310, and determines whether the motion data belonging to the current supporting area 120 is well aligned or not. The step 321 consequently outputs aligned supporting area data 324 (see FIG. 6B).

An "aligned motion" means that all the coding units covered by the current supporting area 120 have the same prediction mode (such as Intra mode, Skip mode, or Inter mode) with a set of equal motion vector values.

If the output from the step 321 is YES, then the process 320 follows a YES arrow to an express coding unit motion mapping process 322 which produces the classification index based on the motion data from the current supporting area 120 after which the process 320 terminates with an end step 351 and the classification index 313 is output to the motion vector candidate formulation process 331 (see FIG. 3).

If however the decision step 321 returns a logical FALSE value, then the process 320 follows a NO arrow to a standard coding unit classification process 323 which generates the classification index 313 by operation on the motion data of the supporting area 120 for the current coding unit. The process 320 then ends with the END step 351.

Figure 6B:
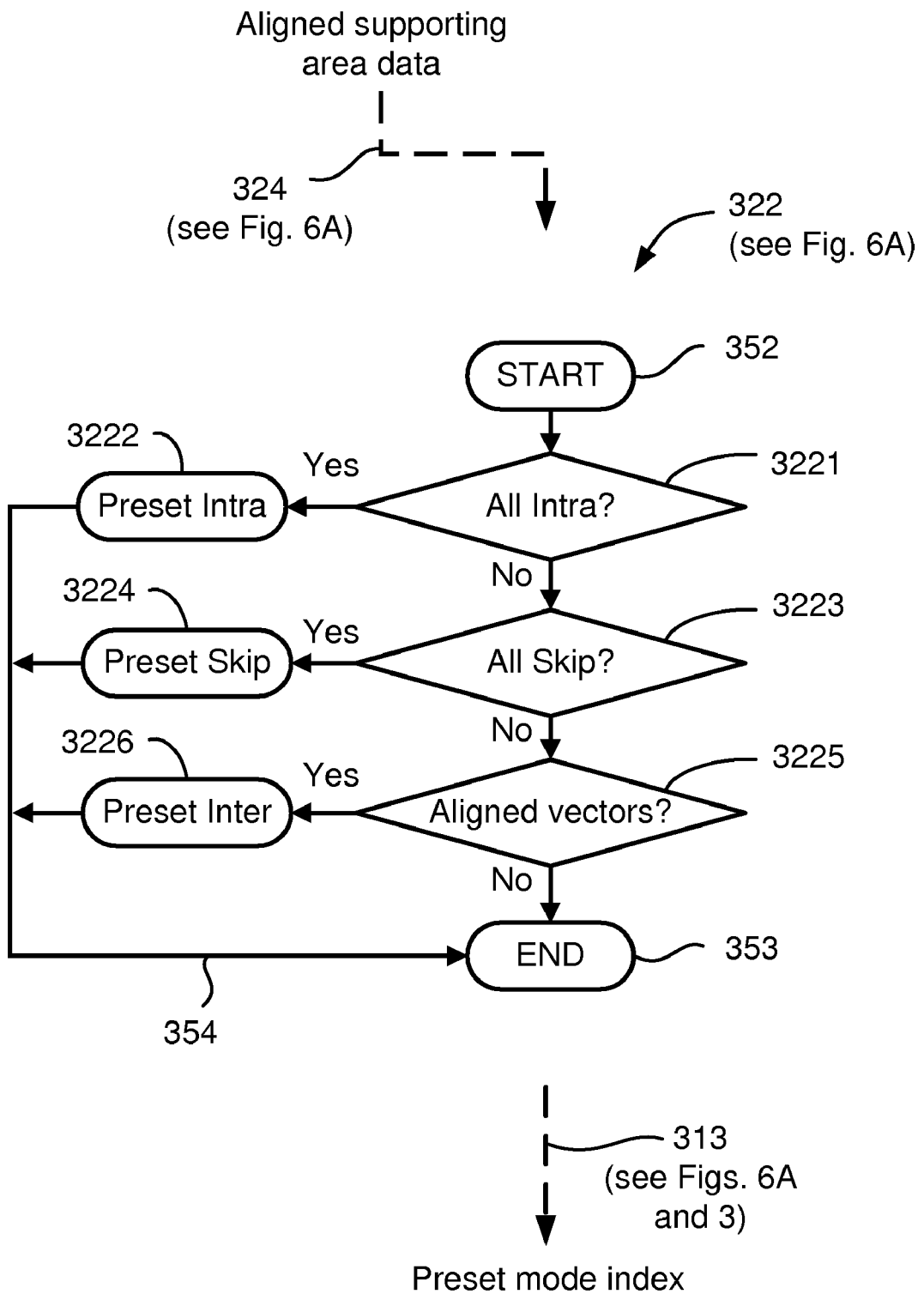
FIG. 6B is a process flow diagram for the express coding unit motion mapping process of FIG. 6A.

FIG. 6B is a process flow diagram for the express coding unit motion mapping process 322 of FIG. 6A. The process 322 commences with a start step 352 after which aligned motion data 324 corresponding to the supporting area 120 of the current output coding unit is processed by a step 3221 (the "motion data" may include at least the prediction mode and/or the motion vector associated with each coding unit of the current supporting area 120). If all the input coding units covered by the supporting area 120 are in Intra mode, then the process 322 follows a YES arrow to a step 3222 which classifies the current output coding unit as "Preset Intra". The process 322 then outputs the preset mode index 313 and follows an arrow 354 to an End step 353.

If the decision step 3221 returns a FALSE value, then the process 322 follows a NO arrow to a step 3223, which further evaluates the motion data 324. If the step 3223 determines that all the input coding units covered by the supporting area 120 are in Skip mode, the process 322 follows a YES arrow to a step 3224 which classifies the current output coding unit as "Preset Skip". The process 322 then outputs the preset mode index 313 and follows the arrow 354 to the End step 353.

If the decision step 3223 returns a FALSE value, then the process 322 follows a NO arrow to a step 3225, which further evaluates the motion data 324 to see if all the input coding units covered by the supporting area 120 have an equal motion vector value. If the step 3225 returns a logical TRUE, then the process 322 follows a YES arrow to a step 3226 which classifies the current output coding unit as "Preset Inter". The process 322 then outputs the preset mode index 313 and follows the arrow 354 to the End step 353.

No output data 313 is produced if the step 3225 returns a logical FALSE, because such a case does not exist for the "Aligned motion" data. After each respective step 3222, 3224, and 3226 the process 322 outputs the corresponding index 313 of the preset mode, namely, Preset Intra, Preset Skip, and Preset Inter, to the resampling process 330.

Figure 6C:
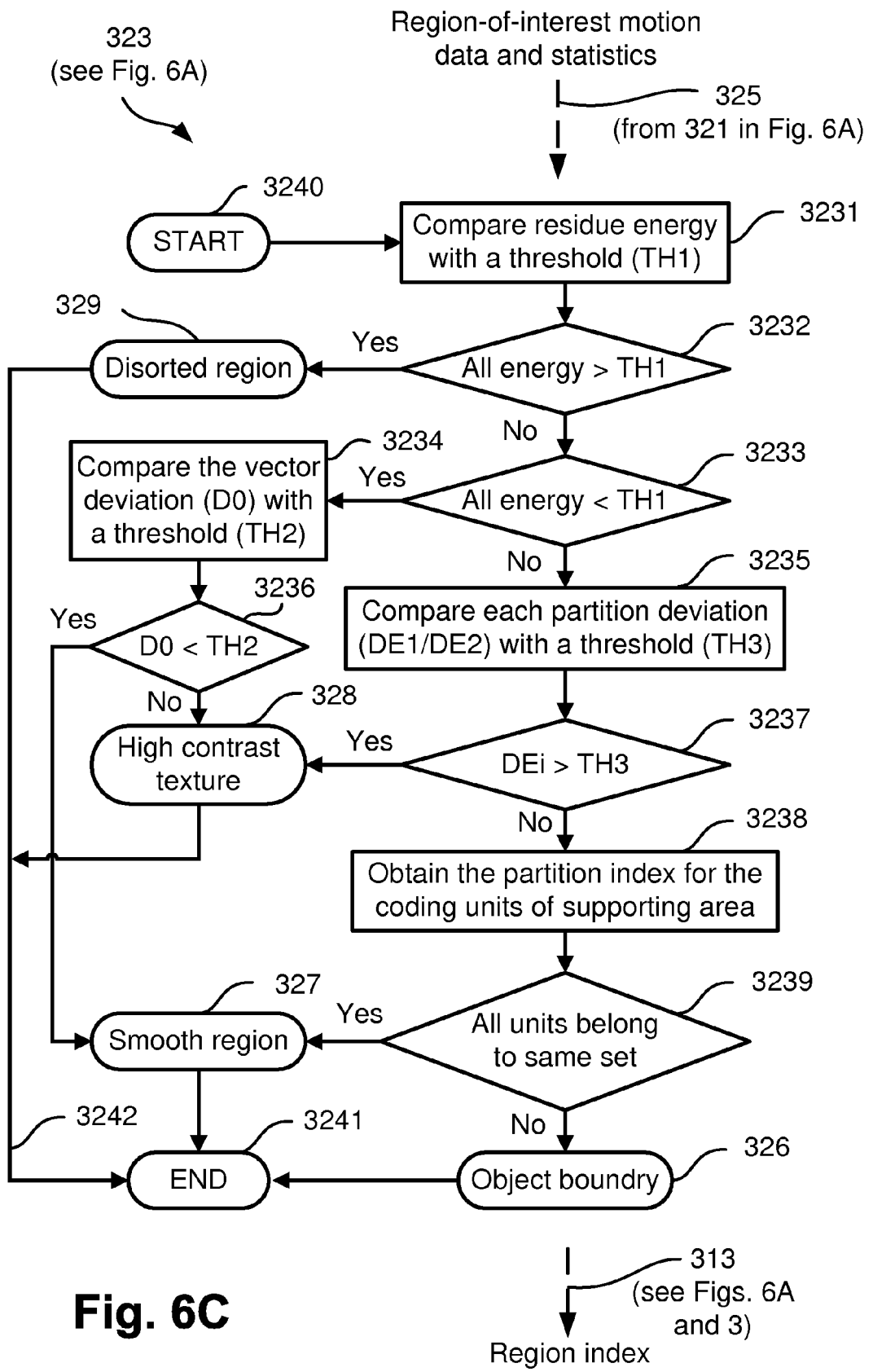
FIG. 6C is a process flow diagram of the standard coding unit classification process in FIG. 6A.

FIG. 6C is a process flow diagram of the standard coding unit classification process 323 in FIG. 6A. The motion data and statistics 325 that is generated for the current area-of-interest by the area of interest motion statistics module 316 in FIG. 5A is the input for the standard coding unit classification process 323 in FIG. 6A. The process 323 commences with a start step 3240, after which a step 3231 analyses the motion data and statistics 325 by comparing the motion residue energy associated with the predominant prediction mode of the area-of-interest with a preset threshold (TH1). If a subsequent decision step 3232 finds that every residue associated with the predominant prediction mode of the current area-of-interest is bigger than TH1 (which means that all the motion prediction in the original resolution is not accurate), then the process 323 follows a YES arrow to a step 329 that classifies the current output coding unit to be a "Distorted region". The process 323 then follows an arrow 3242 to an END step 3241.

If the step 3232 returns a logical FALSE value, then the process 323 follows a NO arrow to a step 3233 which determines if all the residue energies are smaller than the threshold TH1. If this is the case, then the process 323 follows a YES arrow to a step 3234 in which the L2-norm deviation of all the motion vectors (D0), which has been calculated by the area of interest motion statistics module 316 in FIG. 5A, is compared to another threshold TH2. If a subsequent decision step 3236 determines that the value of D0 is smaller than TH2, which implies that all the motion vectors in the predominant prediction mode are quite similar to each other and hold a good level of prediction accuracy, then the process 323 follows a YES arrow to a step 327 in which the current output coding unit is classified as "Smooth region". The process 323 is then directed to the END step 3241.

If the value of D0 is found to be larger than TH2 in the step 3236 (which represents the case that the motion predictions in the original resolution are accurate, but the motion vectors in the area-of-interest are diversified), then the process follows a NO arrow to a step 328 which classifies the current output coding unit "High contrast texture". The process 323 is then directed to the END step 3241.

Returning to the step 3233, if the motion residue energies associated with the predominant prediction mode of the current area-of-interest are distributed across the threshold TH1 (i.e., not all the residue energies are smaller than the threshold TH1), then the process follows a NO arrow to a step 3235 which analyses the entire motion vector set associated with the predominant prediction mode in the form of two partitioned subsets.

The statistics of the two partition subsets, that has been generated by the area of interest motion statistics module 316 in FIG. 5A, is provided to the process 3235. In the step 3235 the deviation of the residue energy corresponding to each partition subset, namely DE1 and DE2, is compared to a preset threshold TH3. If a subsequent decision step 3237 determines that any of DE1 and DE2 is bigger than the threshold TH3, which represents the case where it is unlikely that there exist two set of high accurately matched motion vectors (as always happen at object boundaries), then the process 323 follows a YES arrow to a step 328 which classifies the current output coding unit as "High contrast texture". The process 323 is then directed to the END step 3241.

If however the step 3237 determines that all the deviations of the residue energies corresponding to each partitioned subset are smaller than the threshold TH3, then this means that there are, with high probability, two sets of high accurately matched motion vectors in the current area-of-interest area. In this event, the process 323 follows a NO arrow to a step 3238 which double checks the partition subset index (i.e., subset No. 1 or subset No. 2) of the coding units which belongs to the supporting area. If in a subsequent step 3239 it transpires that all the coding units belongs to the same partition subset index, then the current output coding unit should be located in a smooth area on either side of an object boundary. The process 323 thus follows a YES arrow to a step 327 which classifies the coding unit as "Smooth region". The process 323 then is directed to the END step 3241.

On the other hand, if the step 3239 determines that the index for coding units belonging to the current supporting area straddles both subsets, then the current coding unit is located across an object boundary. In this even the process 323 follows a NO arrow to a step 326 which classifies the coding unit as "Object boundary".

The output 313 from the process 323 is the index of the different type of region to which the current output coding unit is classified, namely Smooth region, Distorted region, Object boundary, or High contrast texture.

It is noted that this aforementioned set of region types only represents a preferred embodiment of the present AIMVD arrangements. Further extension types of region may be used in the classification process 323.

Switch-Based Motion Resampling

Returning to FIG. 3, after the classification for the output coding unit is performed in the classifier 320 using the statistics data 311 from the area-of-interest analyser 310, the classification index 313 and the predominant prediction mode 314 from the area-of-interest analyser 310 are input into the classification oriented motion resampling process 330, which comprises two main functional blocks namely, a motion vector candidate formulation block 331, and a switch-based multi-bank resample filtering block 332.

The index 313 from the classifier 320 is used to select a subset (referred to as a local region) of all the motion data from the current region-of-interest according to the predominant prediction mode, and to index a group of re-sampling filters. Each re-sampling filter is adapted to generate a downscaled motion vector that best matches the characteristics of the classified local region.

The re-sampling filtering in the classification-oriented re-sampling module 330 operates in a recursive manner, in a similar fashion to the operation of the area of interest analysis module 310. Accordingly, the results generated by the classification-oriented re-sampling module 330 for a previous coding unit are used as inputs to the area of interest analysis module 310 for a current coding unit The output 253 of the motion resampling process 330 represents encoding side information (which includes at least the predominant prediction mode and the re-sampled motion vector but is not limited thereto) for the current coding unit 230. This information is thus output to the encoding module 230 in FIG. 2 for generation of the transcoded scaled bit-stream.

The encoding side information 253 is also fed back to the area-of-interest analyser 310 as the coding unit "neighbour side information" for generating the side information for the next output coding unit.

Figure 7:
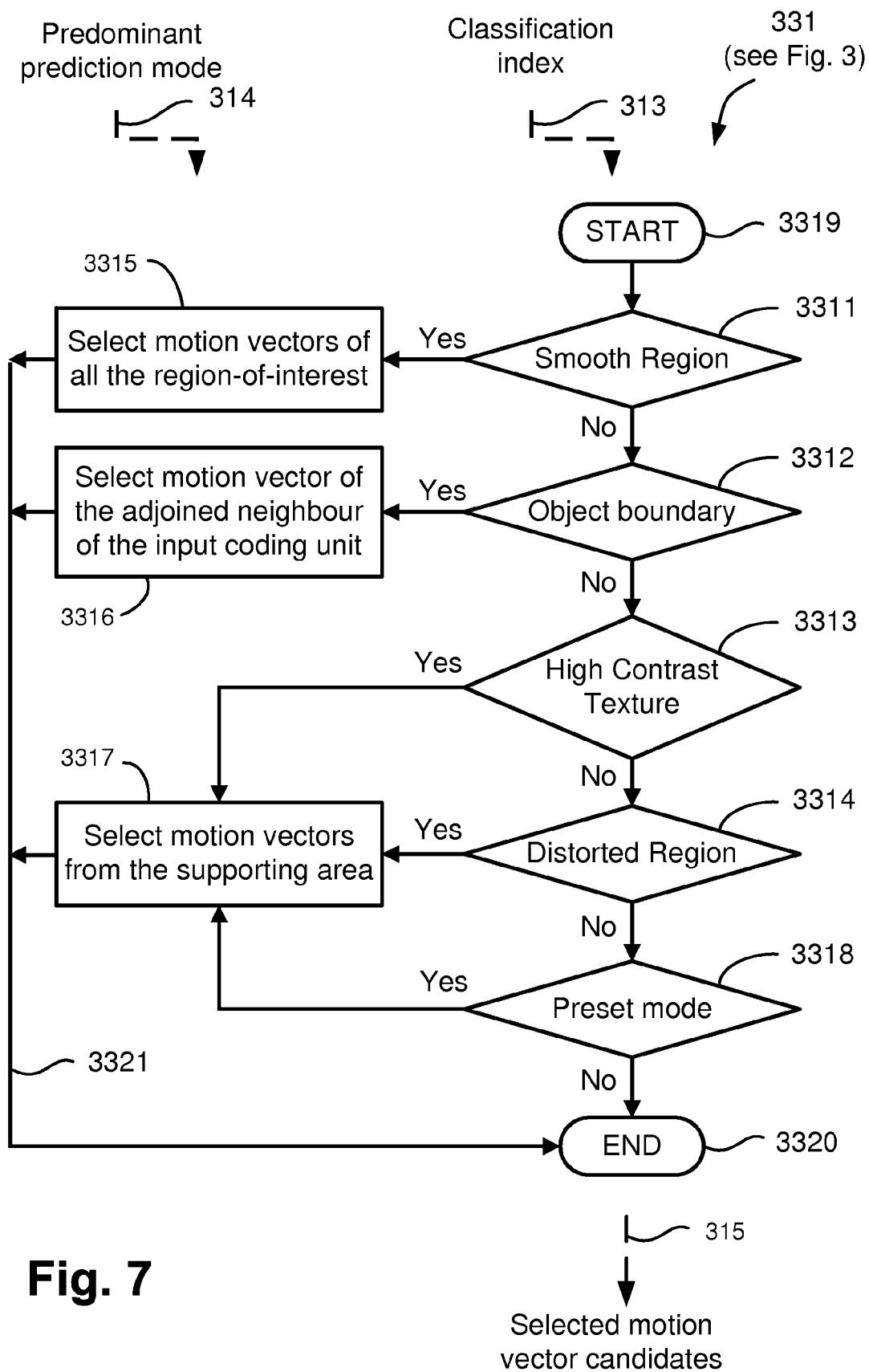
FIG. 7 is a process flow diagram of the motion vector candidate formation process in FIG. 3.

FIG. 7 is a process flow diagram of the motion vector candidate formation process 331 in FIG. 3. The classification index 313 that is output from the classifier 320 in FIG. 3 is used in the process 331 to control the selection of the motion vector candidates for the resample filtering process. The predominant prediction mode 314 that is output from the analyser 310 in FIG. 3 is also used in the process 331.

The process 331 commences with a start step 3319 after which a step 3311 determines if the index points to a Smooth Region. If this is the case, then the process 331 follows a YES arrow to a step 3315 which selects the motion vector candidates to be all motion vectors in the predominant prediction mode from the current area-of-interest. The process 331 then follows an arrow 3321 to an END step 3320.

Otherwise, if the step 3311 returns a logical FALSE value, then the process 331 follows a NO arrow to a step 3312 which determines if the index points to an Object boundary. If this is the case, then the process 331 follows a YES arrow to a step 3316 which selects the motion vector candidates as all motion vectors in the predominant prediction mode from the adjoining coding units of the current output coding unit. The process 331 then follows the arrow 3321 to the END step 3320.

Otherwise, if the step 3312 returns a logical FALSE value, then the process 331 follows a NO arrow to a step 3313 which determines if the index points to a High Contrast Texture. If this is the case then the process 331 follows a Yes arrow to a step 3317 which selects the motion vector candidates as all motion vectors in the predominant prediction mode from the current supporting area only. The process 331 then follows the arrow 3321 to the END step 3320.

Otherwise, if the step 3313 returns a logical FALSE value, then the process 331 follows a NO arrow to a step 3314 which determines if the index points to a Distorted Region. If this is the case then the process 331 follows a YES arrow to the step 3317 which selects the motion vector candidates as all motion vectors in the predominant prediction mode from the current supporting area only. The process 331 then follows the arrow 3321 to the END step 3320.

Otherwise, if the step 3314 returns a logical FALSE value, then the process 331 follows a NO arrow to a step 3318 which determines if the index points to a Preset mode. If this is the case then the process 331 follows a YES arrow to the step 3317 which selects the motion vector candidates as all motion vectors in the predominant prediction mode from the current supporting area only. The process 331 then follows the arrow 3321 to the END step 3320.

The selected motion vector candidates 315 are outputted by the process 331 to the switch-based multi-bank resample filtering block 332.

TABLE 1

Preferred filtering operation for each of the classified region/mode

| Region | filter | Method description |
|---|---|---|
| Preset mode | identity | $mv_r = \frac{1}{R} mv_i$ |
| Smooth region | Vector median (MDN) | $mv_r = \frac{1}{R} \arg\min_{mv_i} \left\{ \sum_{j=1}^{N} \|mv_i - mv_j\| \right\}$ |
| Object boundary | Predictive motion estimation (PME) | $mv_r = \frac{1}{R} \arg\min_{mv_i} \{SAD_i\}$ |
| High contrast Texture | Maximum DC (DCmax) | $mv_r = \frac{1}{R} \arg\min_{mv_i} \{DC_i\}$ |
| Distorted region | Maximum-QB-area (MQBA) | $mv_r = \frac{1}{R} \arg\max_{mv_i} \left\{ \sum_{j=1}^{N} A_j C_j \right\}$, where $A_j$ is the supporting area size of each motion vector candidate, and $C_j$ is coding complexity of each motion vector candidate, which is defined as the product of quantisation step-size and the number of encoded-bits. |

Table 1 demonstrates the mapping between the classified region/mode and the dedicated motion resampling filters (333-335), where the motion vector candidates selected by the process 331 are denoted as $mv_i$, the downscale ratio is $$\frac{1}{R},$$

and output motion vector from the resampling filter is denoted as $mv_r$.

For any Preset mode generated from the process 322 in FIG. 6B, an identity filter is used to generate the downscaled motion vector. That is, the filter selects one of the input motion vectors, downscales the vector according to the downscale ratio, and outputs the downscaled motion vector to the encoding module 230 (see FIG. 1).

If the classification index 313 points to a Smooth Region, then a vector median filter is used to generate the resampled motion vector. The input motion vector which has the smallest aggregated Euclidean distance (L2 distance) to all other motion vector candidates is selected as the output of the resampling filter and downscaled according to the preset ratio $$\frac{1}{R}$$

according before outputting to the encoding module 230.

If the classification index 313 points to an Object boundary, then a Predictive-motion-estimation filter is used to generate the resampled motion vector. This filter downscales each each motion vector candidate first according to the preset ratio $$\frac{1}{R}.$$

Then each downscaled motion vector candidate is evaluated against the downscaled reference frame using the Sum of absolute difference (SAD) criteria. The motion candidates which result in the minimum SAD value are selected as the output of the resampling filter and outputted to the encoding module 230.

If the classification index 313 points to a High Contrast Texture, then a Maximum-DC filter is used to generate the resampled motion vector. This filter compares the DC DCT coefficient value out the motion residue of motion vector candidates. The motion candidate which results in the maximum DC value is selected as the output of the resampling filter and downscaled according to the preset ratio $$\frac{1}{R}$$

according before outputting to the encoding module 230.

If the classification index 313 points to a Distorted Region, then a Maximum-QB-area filter is used to generate the resampled motion vector. This filter calculate a QB-area measure for each of the motion vector candidates, which is a multiple of the overlapping area each motion vector has with the supporting area, and the product of quantisation step side and the number of encoding bits corresponding to the associate input coding unit. The motion candidate which results in the QB-area value is selected as the output of the resampling filter and downscaled according to the preset ratio $$\frac{1}{R}$$

according before outputting to the encoding module 230.

Parameter Configuration and Training Procedure

The analysis and the classification of a local region requires a number of preset thresholds. The values of these thresholds are trained on representative video sequences and adjusted carefully. One arrangement of the threshold training and adjustment process is presented below. The process operates on a frame basis, and consists of several steps as follows:

1) Dumping the pre-encoding motion vector and block residue data from the decoding side;
2) Dumping the downscaled motion vector and block residue from a tandem transcoder.
3) Classifying the downscaled frame manually into smooth region, object boundary, distorted region, and high contrast texture on the MB basis.
4) Generating a neighbourhood motion vector/residue map according to FIG. 8 for each scaled MB positions.
5) Tweaking the threshold one by one to minimize the misclassification case number.

It is noted that after the classification of the downscaled frame, a histogram based approach can also been used to find an initialized value for each of the thresholds using a classic discrimination algorithm such as the Fisher Discriminator.

It is noted that variation of the preferred motion resampling methods can include different ways to determine the motion vector candidates for motion resampling, and dedicates different types of resampling filter to each of the classification region types. Moreover, the AIMVD arrangements disclosed herein and those specific terms employed are to intended to be generic and descriptive only, and are not intended as limitations. Accordingly, it will be understood by those of ordinary skill in the art that various changes in form and details may be made without departing form the spirit and scope of the present invention.

INDUSTRIAL APPLICABILITY

It is apparent from the above that the arrangements described are applicable to the data processing industries.

The foregoing describes only some embodiments of the present invention, and modifications and/or changes can be made thereto without departing from the scope and spirit of the invention, the embodiments being illustrative and not restrictive.

We claim:

1. A method of generating a scaled motion vector for an output coding unit, said method comprising the steps of:
   selecting, for the output coding unit in a compressed output video stream, an area-of-interest having coding units from a compressed input video stream, wherein the input resolution of the input video stream is different from the output resolution of the output video stream;
   classifying the output coding unit based on statistics of motion data from the area-of-interest, the motion data being contained in the input video stream, wherein the classification of the output coding unit is selected as one of a smooth region, an object boundary, a distorted region or high contrast textures;
   selecting from a pre-defined set of re-sampling filters a re-sampling filter dependent upon said classification for the output coding unit, wherein the re-sampling filter generates said scaled motion vector to match characteristics of the classified output coding unit from motion data of the input video stream; and
   applying the selected re-sampling filter to motion vectors from said area-of-interest to generate the scaled motion vector for the output coding unit in the compressed output video stream.

2. A method according to claim 1 wherein the area-of-interest comprises a supporting area covering input coding units of an input video frame from which the output coding unit is generated.

3. A method according to claim 2, wherein the area-of-interest further comprises neighboring output coding units of the output coding unit.

4. A method according to claim 3, wherein the motion data comprises input motion data from an area of the input video frame that generated the output coding unit, said area corresponding to the output coding unit and the neighboring output coding units of the output coding unit.

5. A method according to claim 4, wherein said motion data further comprises computed motion data from a neighboring output coding unit of said output coding unit.

6. A method according to claim 5, wherein said motion data further comprises at least one of a prediction mode, a motion vector, a motion residual, a quantization method, a quantization level, and a bit allocation.

7. A method according to claim 1, wherein the area-of-interest further includes coding units from the output video stream.

8. An apparatus for generating a scaled motion vector for an output coding unit, said apparatus comprising:
   a selector configured to select, for the output coding unit in a compressed output video stream, an area-of-interest having coding units from a compressed input video stream, wherein an input resolution of the input video stream is different from the output resolution of the output video stream;
   a classifier configured to classify the output coding unit based on statistics of motion data from the area-of-interest, the motion data being contained in the input video stream, wherein the classification of the output coding unit is selected as one of a smooth region, an object boundary, a distorted region or high contrast textures;
   a re-sampling filter selector, configured to select from a pre-defined set of re-sampling filters a re-sampling filter dependent upon said classification for the output coding unit, wherein the re-sampling filter generates said scaled motion vector to match characteristics of the classified output coding unit from motion data of the input video stream;
   said set of pre-defined re-sampling filters; and
   a re-sampling module configured to apply the selected re-sampling filter to motion vectors from said area-of-interest to generate the scaled motion vector for the output coding unit in the compressed output video stream.

9. An apparatus for generating a scaled motion vector for an output coding unit, said apparatus comprising:
   a memory for storing a program; and
   a processor for executing the program, said program comprising:
   code for selecting, for the output coding unit in a compressed output video stream, an area-of-interest having coding units from a compressed input video stream, wherein an input resolution of the input video stream is different from the output resolution of the output video stream;
   code for classifying the output coding unit based on statistics of motion data from the area-of-interest, the motion data being contained in the input video stream, wherein the classification of the output coding unit is selected as one of a smooth region, an object boundary, a distorted region or high contrast textures;
   code for selecting from a pre-defined set of re-sampling filters a re-sampling filter dependent upon said classification for the output coding unit, wherein the re-sampling filter generates said scaled motion vector to match characteristics of the classified output coding unit from motion data of the input video stream; and
   code for applying the selected re-sampling filter to motion vectors from said area-of-interest to generate the scaled motion vector for the output coding unit in the compressed output video stream.

10. A computer program product comprising a non-transitory computer readable medium having a computer program recorded therein for directing a processor to execute a method for generating a scaled motion vector for an output coding unit, said program comprising:
    code for selecting, for the output coding unit in a compressed output video stream, an area-of-interest having coding units from a compressed input video stream, wherein an input resolution of the input video stream is different from the output resolution of the output video stream;
    code for classifying the output coding unit based on statistics of motion data from the area-of-interest, the motion data being contained in the input video stream, wherein the classification of the output coding unit is selected as one of a smooth region, an object boundary, a distorted region or high contrast textures;

code for selecting from a pre-defined set of re-sampling filters a re-sampling filter dependent upon said classification for the output coding unit, wherein the re-sampling filter generates said scaled motion vector to match characteristics of the classified output coding unit from motion data of the input video stream; and code for applying the selected re-sampling filter to motion vectors from said area-of-interest to generate the scaled motion vector for the output coding unit in the compressed output video stream.

11. An apparatus for generating a scaled motion vector for an output coding unit, said apparatus comprising:

means for selecting, for the output coding unit in a compressed output video stream, an area-of-interest having coding units from a compressed input video stream, wherein an input resolution of the input video stream is different from the output resolution of the output video stream;

means for classifying the output coding unit based on statistics of motion data from the area-of-interest, the motion data being contained in the input video stream, wherein the classification of the output coding unit is selected as one of a smooth region, an object boundary, a distorted region or high contrast textures;

means for selecting from a pre-defined set of re-sampling filters a re-sampling filter dependent upon said classification for the output coding unit, wherein the re-sampling filter generates said scaled motion vector to match characteristics of the classified output coding unit from motion data of the input video stream;

said set of pre-defined re-sampling filters; and means for applying the selected re-sampling filter to motion vectors from said area-of-interest to generate the scaled motion vector for the output coding unit in the compressed output video stream.

* * * * *